May 28, 1957 — W. E. PAYNE — 2,793,653
SYSTEM FOR SUPPLYING WATER TO AN ANIMAL WATERING VESSEL
Filed Jan. 28, 1955 — 2 Sheets-Sheet 2
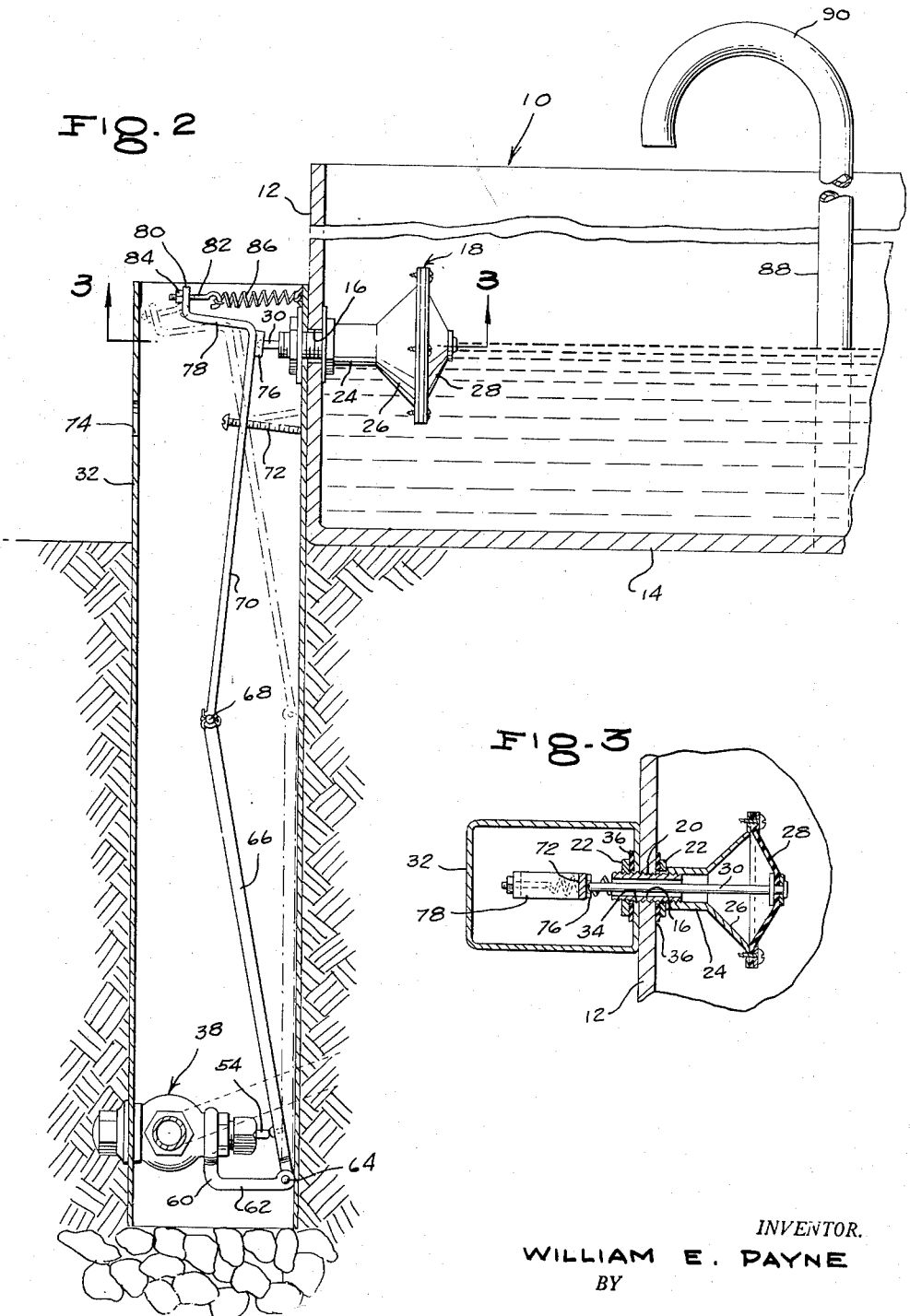
INVENTOR.
WILLIAM E. PAYNE
BY
McMorrow, Berman & Davidson
ATTORNEYS

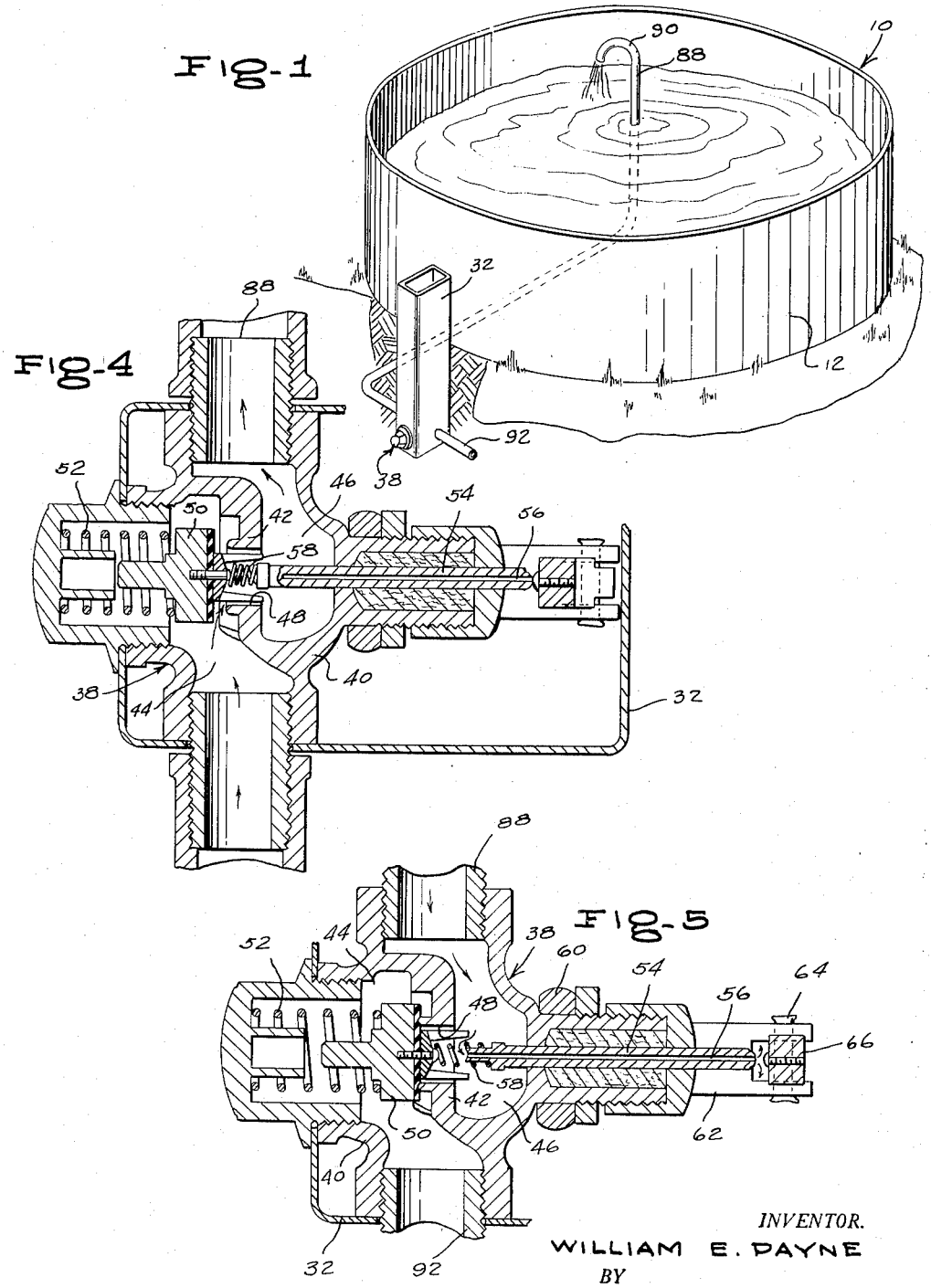

United States Patent Office 2,793,653
Patented May 28, 1957

2,793,653

SYSTEM FOR SUPPLYING WATER TO AN ANIMAL WATERING VESSEL

William E. Payne, Stillwater, Okla.

Application January 28, 1955, Serial No. 484,737

2 Claims. (Cl. 137—403)

This invention relates to a system for supplying water to an animal watering vessel and has for its primary object to prevent contamination of the water in the system by the siphoning of water from the vessel into the system.

Another object is to avoid freezing of water in the discharge pipe of the system and possible damage to said pipe.

A further object to provide for draining the water from the discharge pipe through a valve in the system which controls the water entering the discharge pipe.

A still further object is to provide for opening of said valve when the level of the water in the animal watering vessel falls below a predetermined level and for closing the valve when the water has attained a predetermined level in the watering vessel.

The above and other objects may be attained by employing this invention which embodies among its features a normally closed valve connected to a water supply system, a water discharge pipe connected to the valve and having its discharge end disposed above the normal water level in an animal watering vessel and pressure responsive means within the vessel near the bottom thereof and operatively connected to the valve for opening said valve when the level of water in the vessel falls below a selected level.

Other features include a bleeder passage extending through the valve which communicates with the discharge pipe when the valve is closed for draining water from the pipe to prevent injury to the pipe through freezing of water therein.

Still other features include a casing adjacent the animal watering vessel and extending downwardly below the bottom thereof, a normally closed valve in the tube adjacent the lower end thereof and connected to a water supply, a water discharge pipe connected to the valve and extending upwardly therefrom adjacent the tube, said water discharge pipe having its upper discharge end disposed above the normal level of water in the animal watering vessel and in upwardly spaced relation thereto, pressure responsive means in the vessel adjacent the bottom thereof and extending into the casing, and links within the casing and operatively engaged with the valve and with the pressure responsive means for opening said valve when the level of water in the vessel falls below a selected level.

In the drawings:

Figure 1 is a perspective view of an animal watering vessel and a system in accordance with the present invention associated therewith;

Figure 2 is a fragmentary enlarged transverse vertical sectional view through the animal watering vessel or tank illustrated in Figure 1;

Figure 3 is a horizontal sectional view taken substantially on the line 3—3 of Figure 2;

Figure 4 is a fragmentary enlarged sectional view through the valve and a portion of the casing showing the valve in opened position; and Figure 5 is a fragmentary sectional view similar to Figure 4, showing the valve in closed position.

Referring to the drawings in detail, the illustrated system comprises an animal watering tank designated generally 10 comprising a side wall 12 and a bottom 14. Extending through the side wall 12 adjacent the bottom 14 is an opening 16, the purpose of which will hereinafter appear.

A pressure responsive unit designated generally 18 comprises a threaded tube 20 which extends through the opening 16 and has thereon clamping nuts 22. Threaded on the inner end of the tube 20 is one end of a tubular neck 23 having on its outer end a flared funnel-shaped portion 26. A diaphragm of flexible material is secured to the enlarged end of the funnel-shaped portion 26 and forms a water-tight junction therewith. A push rod 30 is secured at one end to the diaphragm 28 in any conventional manner and said push rod extends longitudinally through the neck 24 and through the tube 20 and has an outer end arranged to engage a lever structure which is fully described hereinafter. A vertical tubular casing 32 of elongated substantially rectangular formation is provided adjacent its upper end with an opening 34 which, as illustrated in Figures 2 and 3, registers with the opening 16 in the tank wall 12, and receives the tube 20 which is clampingly secured to the tank wall 12 and casing 32 by means of the clamping nuts 22. Liquid-tight connections are established around the openings 16 and 34 through the medium of conventional gaskets 36. It will thus be seen that the push rod 30 extends into the interior of the casing 32 and is arranged to be moved longitudinally in response to the pressure of water acting upon the diaphragm 28 within the vessel 10.

Mounted in the casing 32 below the bottom 14 of the vessel 10 is a valve designated generally 38 which comprises a cruciform valve body 40 having a partition 42 therein defining a water inlet chamber 44 and a water discharge chamber 46. The partition 42 is provided with a port 48 which establishes communication between chambers 44 and 46. Mounted in the chamber 44 for movement on an axis which extends through the port 48 is a valve 50 which is yieldingly urged into closing relation to the port 48 by a compression coiled spring 52 which is compressed between the valve 50 and the closed end of an arm 51 of the body 40. Mounted in another arm 53 of the valve body is a plunger 54 which is aligned with the valve 50 and which when moved inwardly engages the valve 50 through the port 48 and moves it to open position, as in Figure 4. The plunger 54 is provided with a longitudinally extending bleed passage 56 which, when the plunger is moved into engagement with the valve 50, is closed by said valve so as to prevent the escape of liquid through the passage 56 from the chamber 44 during the period of time that the valve 50 is disengaged from the partition wall 42 and the port 48 is open. A compression coiled spring 58 is mounted on the inner end of the plunger 56 and extends longitudinally beyond the inner end thereof and engages the valve 50 and yieldably urges the plunger 54 in a direction away from the valve when pressure on the outer end of said plunger is released. The spring 58, of course, is of less tension than the spring 52 so that when the plunger 54 is moved toward the valve 50, the spring 58 will become compressed without disengaging the valve 50 from its seat on the partition wall 42.

Clamped around the arm 53 of the valve body 40 is a yoke 60 carrying an arm 62 which extends alongside of the arm 53, and pivotally mounted as at 64 to said arm is the lower end of a vertical lever 66 which, as illustrated in Figure 2, swings toward and away from the valve 38 and engages the outer end of the plunger 54. Pivotally connected to the upper end of the lever 66 as at 68 is the lower end of a vertical rock arm 70. Extending through said rock arm in threaded engagement therewith intermediate its ends is a stop screw 72 which is adapted to engage the wall of the casing 32 adjacent the wall 12 of the tank 10. Extending through the wall of the casing 32 in alignment with the axis of the screw 72 is an opening 74 through which a screw driver may be inserted into the casing 32 to engage the head of the screw 72 and adjust said screw relative to the rock arm 70. Carried by the rock arm 70 adjacent the upper end thereof is a pad 76 which is engageable by the outer end of the push rod 30 so that as the diaphragm 28 moves under the influence of water pressure within the tank 10, the rock arm 70 will be moved in a direction to move the lever 66 away from the plunger 54 and thereby free the valve 50 to close the port 48. A lateral extension 78 on the upper end of the rock arm 70 has an upwardly extending ear 80 through which a hook 82 is slidably extended. The shank of the hook 82 is externally screw threaded for engagement by a nut 84 by means of which the extent to which the hook projects through the ear 80 may be regulated. A retractile coiled spring 86 is connected to the hook and to the side wall of the casing 32 adjacent to the tank 10 to exert pull on the rock arm 70 and hold it in contact with the push rod 30 so as to expand the diaphragm 28, as illustrated in the drawings. Obviously, the pressure required to compress the diaphragm 28 may be regulated by adjusting the nut 84 and thereby regulating the tension of the spring 86 on the rock arm 70.

Coupled to the valve body 40 in communication with the discharge chamber 46 is a discharge pipe 88 which extends upwardly through the center of the bottom 14 of the tank 10, to a point above the upper end of the tank and terminates in a downwardly extending return bend 90, whose lower end is disposed above the tank 10.

In use, the valve 38 is connected to a water supply line 92 so that water is introduced into the water inlet chamber 44. Whenever the water level in the animal watering vessel 10 falls below a predetermined level, the pressure on the diaphragm 28 diminishes so that the push rod 30 is moved under the influence of the spring 86 to expand the diaphragm 28, the rock arm 70 is swung by the pull of the spring 86 in a direction to swing the lever 66 about the pivot 44 and to exert inward pressure on the plunger to rock about the pivot 44 and to exert pressure on the plunger 54 to move the valve 50 away from the partition 42 and open the port 48 and permit water to pass through the port 48, the discharge chamber 46, through the pipe 88 and gooseneck or return bend 90 to be discharged into the vessel 10. As the water level rises within the vessel, the pressure on the diaphragm 28 will become great enough to collapse or contract the diaphragm 28 and to overcome the tension of the spring 86 so that the push rod 30 will move the rock arm 70 and the lever 66 so that the valve plunger 54 will be moved by the tension of the spring 52 and the spring 52 will close the valve 50. As the valve 50 moves to closed position, the spring 58 will move the plunger away from contact with the valve 50 so that the passage 56 will be opened and any water standing in the pipe 88 will be drained through the passage 56 so as to avoid a possibility of water freezing within the pipe 88 and causing damage thereto. Obviously, owing to the fact that the discharge end of the pipe 88 is located above the top of the tank or vessel 10, there is no possibility whatsoever of water in the tank 10 siphoning back into the water system and hence the purity of the water in the system is preserved.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In combination, a tank, a water pressure actuated member mounted within the tank, said member comprising a flexible diaphragm exposed to liquid within the tank and a push rod connected at one end to the diaphragm and having another end located outside of the tank, a support adjacent to and outside of the tank, an articulated member including a rock arm engaged at one end with said other end of the push rod and having another end, a lever pivotally and supportably engaged at one end with said other end of the rock arm, said lever having another end, a valve structure mounted on said support on which said other end of the lever is pivotally mounted, spring means acting between the support and the rock arm serving to urge said rock arm in a direction to expand said diaphragm when said diaphragm is not collapsed by pressure thereon of liquid in the tank and to position said lever in a first position, and a water discharge pipe connected to said valve structure and having its discharge end disposed above the vessel and in an upwardly spaced relation to the top thereof, said valve structure including a normally closed valve and a plunger movably mounted in said valve structure and having one end normally spaced from said valve and having the other end exposed and engaging said lever in said first position of the lever, pressure of liquid in the tank on said diaphragm serving to collapse the diaphragm and move said push rod in a direction to move said rock arm against the resistance of said spring means and move said lever to a second position wherein said other end of the plunger is moved against the valve and shifts said valve to open position.

2. In combination, a tank, a water pressure actuated member mounted within the tank, said member comprising a flexible diaphragm exposed to liquid within the tank and a push rod connected at one end to the diaphragm and having another end located outside of the tank, a support adjacent to and outside of the tank, an articulated member including a rock arm engaged at one end with said other end of the push rod and having another end, a lever pivotally and supportably engaged at one end with said other end of the rock arm, said lever having another end, a valve structure mounted on said support on which said other end of the lever is pivotally mounted, spring means acting between the support and the rock arm serving to urge said rock arm in a direction to expand said diaphragm when said diaphragm is not collapsed by pressure thereon of liquid in the tank and to position said lever in a first position, and a water discharge pipe connecting said valve structure to said tank, said valve structure including a normally closed valve and a plunger movably mounted in said valve structure and having one end normally spaced from said valve and having the other end exposed and engaging said lever in said first position of the lever, pressure of liquid in the tank on said diaphragm serving to collapse the diaphragm and move said push rod in a direction to move said rock arm against the resistance of said spring means and move said lever to a second position wherein said other end of the plunger is moved against the valve and shifts said valve to open positin.

References Cited in the file of this patent

UNITED STATES PATENTS

| 149,147 | Norris | Mar. 31, 1874 |
| 1,387,760 | Bridges | Aug. 16, 1921 |
| 1,567,944 | Guymon | Dec. 29, 1925 |
| 2,534,509 | Franck | Dec. 19, 1950 |